United States Patent
de Boer et al.

(10) Patent No.: US 6,400,859 B1
(45) Date of Patent: Jun. 4, 2002

(54) OPTICAL RING PROTECTION HAVING MATCHED NODES AND ALTERNATE SECONDARY PATH

(75) Inventors: Evert de Boer; Peter William Phelps, both of Nepean; Louis Rene Pare, St. Bruno; David Charles Steele, Kanata; Stephen Wilson, Nepean, all of (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/339,253

(22) Filed: Jun. 24, 1999

(51) Int. Cl.[7] .................................................. G02B 6/28

(52) U.S. Cl. ............................ 385/24; 385/16; 359/119

(58) Field of Search ............................. 385/16, 17–24; 359/119, 110, 128; 370/222

(56) References Cited

U.S. PATENT DOCUMENTS

| | | | | |
|---|---|---|---|---|
| 5,793,745 A | * | 8/1998 | Manchester | 370/224 |
| 5,920,412 A | * | 7/1999 | Chang et al. | 359/128 |
| 6,256,292 B1 | * | 7/2001 | Ellis et al. | 370/227 |
| 6,259,837 B1 | * | 7/2001 | de Boer et al. | 385/24 |

* cited by examiner

*Primary Examiner*—Frank G. Font
*Assistant Examiner*—Michael P. Mooney

(57) ABSTRACT

The matched nodes provide protection for a failure in the connection between two bidirectional line switched rings. They use a secondary path in case of a primary path failure. The secondary path is set aside in either the working or protection bandwidth of the rings, thus wasting resources. The invention uses a dedicated secondary path between the primary and secondary nodes. With the invention, no ring protection mechanisms are compromised and the ring bandwidth is not wasted. Middle nodes also realize full add/drop capabilities.

9 Claims, 4 Drawing Sheets

OPTICAL RING PROTECTION HAVING MATCHED NODES AND ALTERNATE SECONDARY PATH

FIELD OF INVENTION

The invention resides in the field of telecommunications networks of the type which use fiber optic rings. In particular, it is directed to a novel protection mechanism which finds applications in such telecommunications networks having matched nodes.

BACKGROUND OF INVENTION

Fiber optic rings are widely used for the high speed backbone for telecommunications networks. A bidirectional fiber ring is generally made of at least two optical fibers, one fiber for each direction, to realize a bidirectionality for better performance. For higher reliability and survivability, a bidirectional fiber ring is also provided with a working bandwidth and a protection bandwidth in each direction. These bandwidths are provided either by partitioning each fiber or by provisioning separate fibers. A ring, therefore, may have, two, four or more fibers and separate fibers or any partitions thereof can be set aside as the working and protection bandwidths. In practice, however, separate fibers are generally used for working and protection bandwidths for each direction. A failure in a node or in a path of a ring triggers ring switch from the working bandwidth to protection bandwidth. These bidirectional rings (four fibers or two fibers) is called the bidirectional line switched ring (BLSR for short). Optical signals are transmitted through a ring in SONET or SDH format or some such similar format.

FIGS. 1 and 2 illustrate a two fiber BLSR in normal operations and its protection switching mechanisms respectively. In FIG. 1, the connections between the individual network elements (NEs for short or often interchangeably called nodes in the art as well as in this specification) are bidirectional, a fiber 10 for one direction and a fiber 12 for the opposite direction, as shown by arrows. Each fiber is partitioned 50-50 in bandwidth providing working bandwidths 14 and 16 and protection bandwidths 18 and 20. This provides a 50% protection capacity. At each NE, a desired traffic is dropped from the line traffic and/or added to it from its tributary. The NEs function as add/drop multiplexers which drops traffic destined to them but pass through the line traffic destined to other NEs. They also add traffic from their tributaries to the line traffic. The line traffic is a high speed traffic around the ring and the tributary traffic usually is a low speed local traffic. In the figure NE1 and NE4 are communicating with one another under normal conditions, using working bandwidths 14 and 16. In FIG. 2, a failure 24 occurred between NE2 and NE3. At NE2, the working bandwidths 14 and 16 are looped back onto protection bandwidths 20 and 18 respectively. At NE3, similar switches occur. At NE1 and NE4, the tributary traffic is still added to and dropped off the working bandwidths. All the remaining NEs are switched to "through" mode. The switch-over between the working bandwidth and the protection bandwidth is called "ring switch" and is invoked by setting certain field in the overhead of the traffic.

FIGS. 3 illustrates a four fiber BLSR in the normal operations and the protection switching mechanisms. The working bandwidths 30 and 32 and protection bandwidths 34 and 36 are provided by separate fibers. This provides a 1:1 (100%) protection. If, for example, an interruption 38 occurs between NE2 and NE3, working bandwidths 30 and 32 are looped back at NE2 and NE3 to protection bandwidths 34 and 36 respectively. All the remaining NEs loop through protection bandwidths.

There are different types of traffic demand patterns in the network and therefore there are different types of architectures to fit the variety of demand patterns. The different architectures need to interface each other but they come with different levels of protection, thus making interfacing them a complicated task. One known way of interconnecting two BLSRs is a technology known as the matched nodes.

The "matched nodes" is a technology known in the industry for interconnecting two rings with protection mechanisms. FIG. 4 shows schematically an example of an integrated inter ring protection using the matched nodes between two BLSRs. In this example, one ring 50 is OC192 BLSR and another ring 52 is a OC48 BLSR. Network elements NE1–NE7 reside in ring 50 and network elements NE8–NE12 reside in ring 52. Four separate fibers (working and protection in each direction, designated by w and p respectively) are shown in each ring but similar arrangement can be made in two fiber BLSR environment. The network elements in this illustration are nodes where tributary traffic is added to and/or dropped from line traffic. During provisioning, the primary nodes and secondary nodes are identified on both rings for various paths between any pair of network elements spanning two rings. Therefore, different paths between different NEs would have different pairs of primary and secondary nodes. In FIG. 4, for example, for a traffic over a path between NE1 and NE12, the primary node are NE6 and NE8 and the secondary nodes are NE3 and NE10. The primary node pair and the secondary node pair are connected bidirectionally by fibers which are usually of a lower speed. In this specification, the primary inter-ring connection therefore consists of a bidirectional primary inter-ring circuit and a pair of the primary nodes as do the secondary inter-ring connection of a bidirectional secondary inter-ring circuit and a pair of the secondary nodes. The inter-ring circuits are therefore in fact tributary at the primary nodes or secondary nodes. The path on the primary inter-ring circuit between primary nodes NE6 and NE8 is called the primary path 54. The path in each direction between NE6 and NE8 by way of NE5, NE4, NE3, NE10 and NE9 is called the secondary path 56.

The secondary path 56 is invoked when the primary inter-ring connection fails, that is to say, when either or both of the primary node (NE6 or NE8) and/or the inter-ring circuit between the primary nodes fail. The primary and secondary paths are separately shown in the figure. The secondary path between the primary node and the secondary node on the same ring can be provisioned over either the working bandwidth or the protection bandwidth. Thus, primary nodes NE6 and NE8 have modules 70 and 72 respectively which perform transmission of traffic in either DCW (drop and continue on working) mode or DCP (drop and continue on protection) mode. In DCW mode, line traffic is dropped to the inter-ring connection and the same traffic is continued on downstream nodes toward the secondary node on the working bandwidth. In DCP mode, the traffic is continued on the protection bandwidth.

Primary nodes have service selectors that allow them to choose either the traffic forwarded from its secondary node via the high-speed connection (line traffic in the ring or secondary path) or directly received from the other ring via the low speed connections (primary inter-ring circuit or primary path). In the Figure, primary nodes NE6 and NE8 have service selectors 74 and 76 respectively for bidirectional operation.

The bandwidth for the secondary path is allocated for the sole purpose of protection in the case of the primary inter-ring connection (i.e., a failure in the primary path or in the primary node), thus limiting the ring's total capacity. Furthermore, any middle nodes through which the secondary path passes have no full add/drop capabilities. These conditions therefore reduce the overall capacity and capabilities of the ring. The invention addresses these problems which are associated with matched nodes.

SUMMARY OF INVENTION

Briefly stated, the invention resides in a fiber optic bidirectional line switched ring including a primary and a secondary nodes through which another fiber optic bidirectional line switched ring is connected by way of a primary path and a dedicated secondary path respectively. In accordance with one aspect, a bidirectional line switched ring includes an additional link provisioned between the primary node and the secondary node to form the dedicated secondary path in two directions and the ring also includes the primary node having a failure detection module for detecting a failure in the primary path connecting the two rings and a drop/continue module for transmitting traffic in the primary path in the ring in which the primary node resides onto said dedicated secondary path.

According to a second aspect, the invention is directed to a method of providing protection for failure in a fiber optic bidirectional line switched ring. The ring has a primary and a secondary nodes through which another fiber optic bidirectional line switched ring is connected by way of a primary path and a secondary path respectively. The method includes steps of dropping and continuing a traffic at the primary node onto a dedicated secondary path allocated between the primary and secondary nodes, receiving an indication of a failure in the primary inter-ring connection, and invoking the secondary inter-ring connection in response the indication.

DETAILED DESCRIPTION OF PREFERRED EMBODIMENTS OF INVENTION

As described briefly above, matched nodes use the working (in DCW mode) or protection (in DCP mode) bandwidth of ring for the secondary path. The secondary path is only used under certain failure scenarios of the primary inter-ring connection. In whichever mode matched nodes are provisioned to function, the bandwidth that is allocated for secondary paths cannot be used for anything else. Also, either protection or working bandwidth set aside for the secondary path is set to a "path through" mode at any nodes which are located between the primary and secondary nodes. At any of these middle nodes, no add/drop of traffic is permitted on that bandwidth, thus limiting their capability as well as that of any other nodes on the rings which may want to communicate with these middle nodes. This bandwidth therefore does not generate any revenue and reduces over all capacity of the ring, causing eventually traffic congestion.

The use of secondary path bandwidth is of great concern for network operators who employ particularly large OC192 networks. The invention allows a use of bandwidth that normally would have been unavailable due to the secondary paths. This use would therefore generate revenue which would normally be unrealizable.

Figure 1:
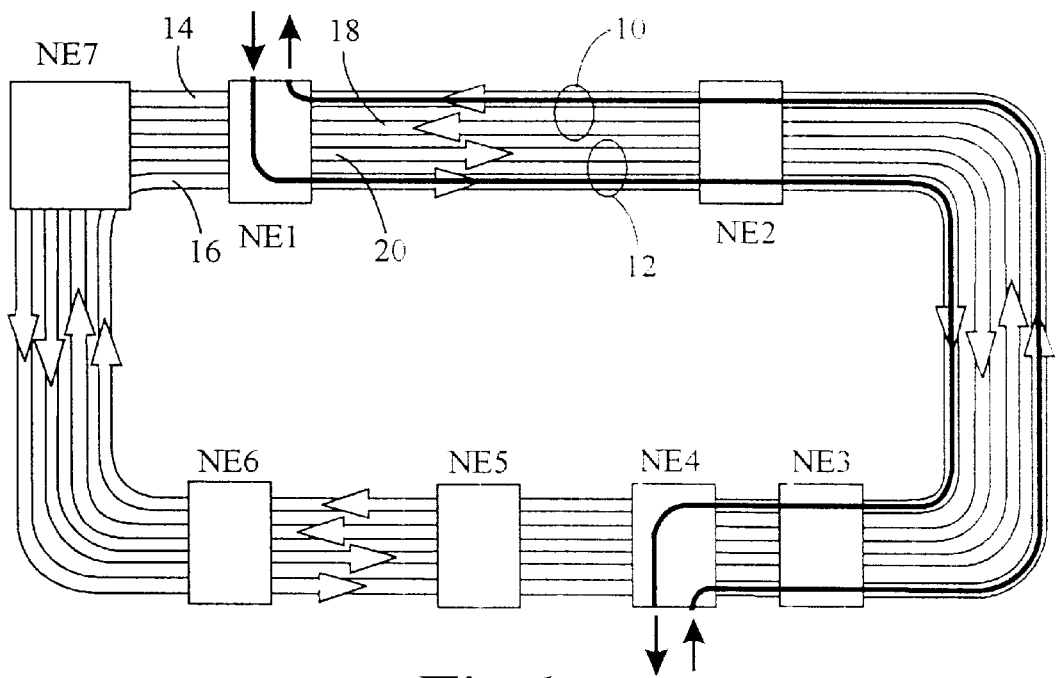
FIG. 1 is a schematic illustration of a two fiber BLSR in normal operations.
Figure 2:
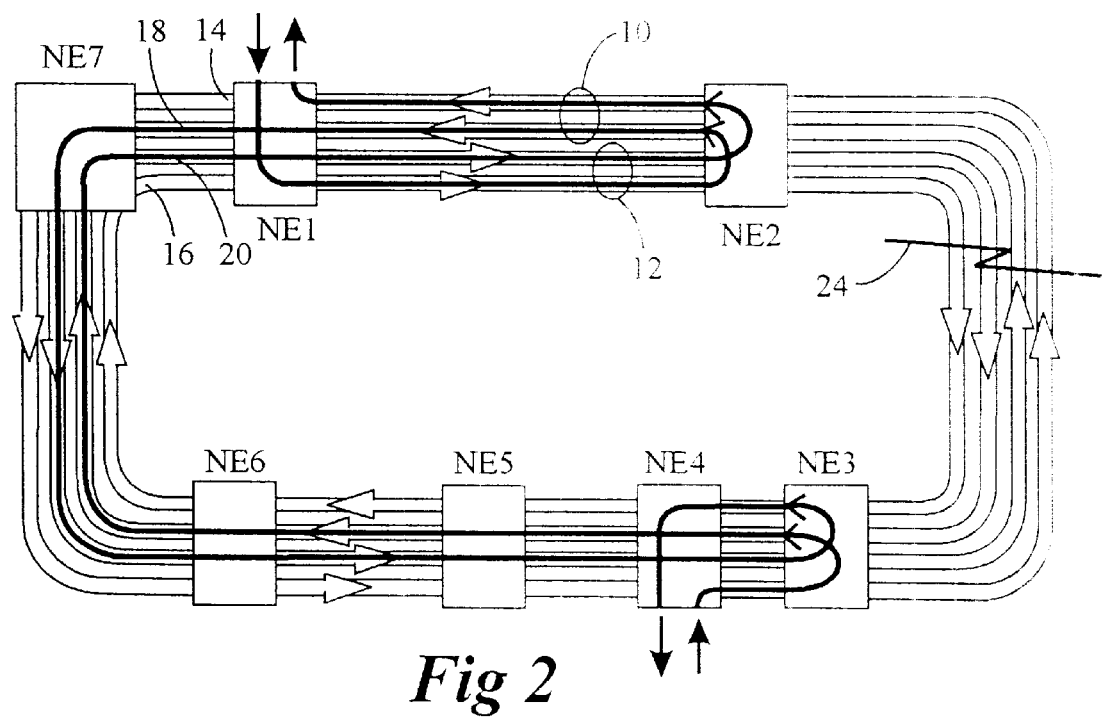
FIG. 2 is a schematic illustration of protection mechanisms of a two fiber BLSR.
Figure 3:
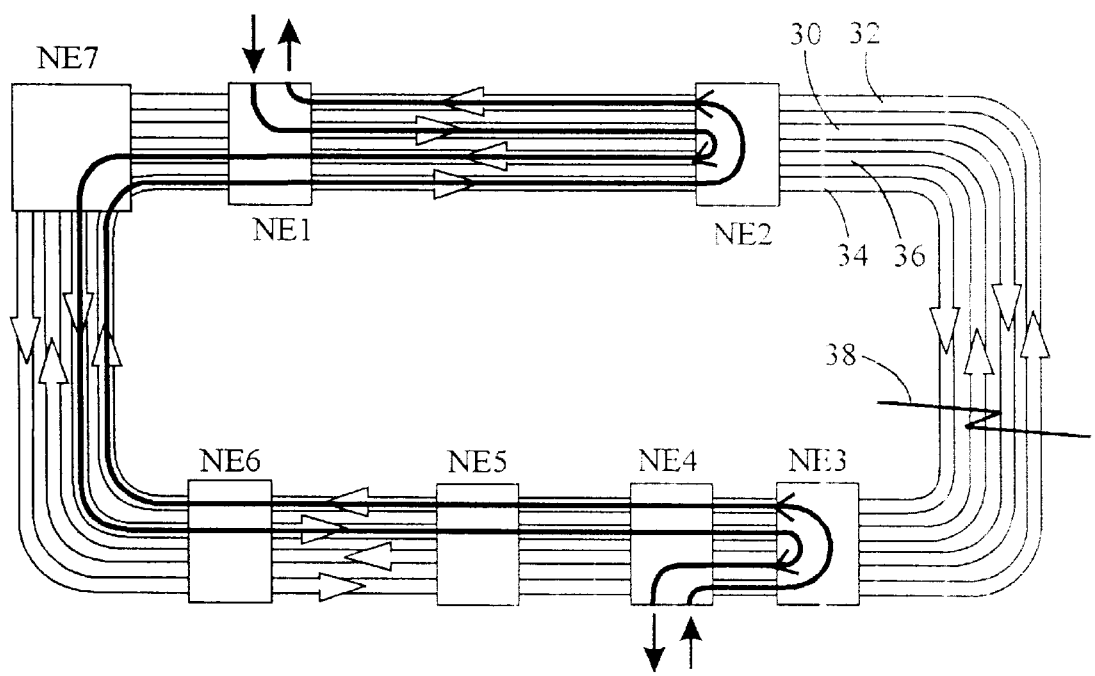
FIG. 3 is a schematic illustration of a four fiber BLSR in normal operations and its protection mechanisms.
Figure 4:
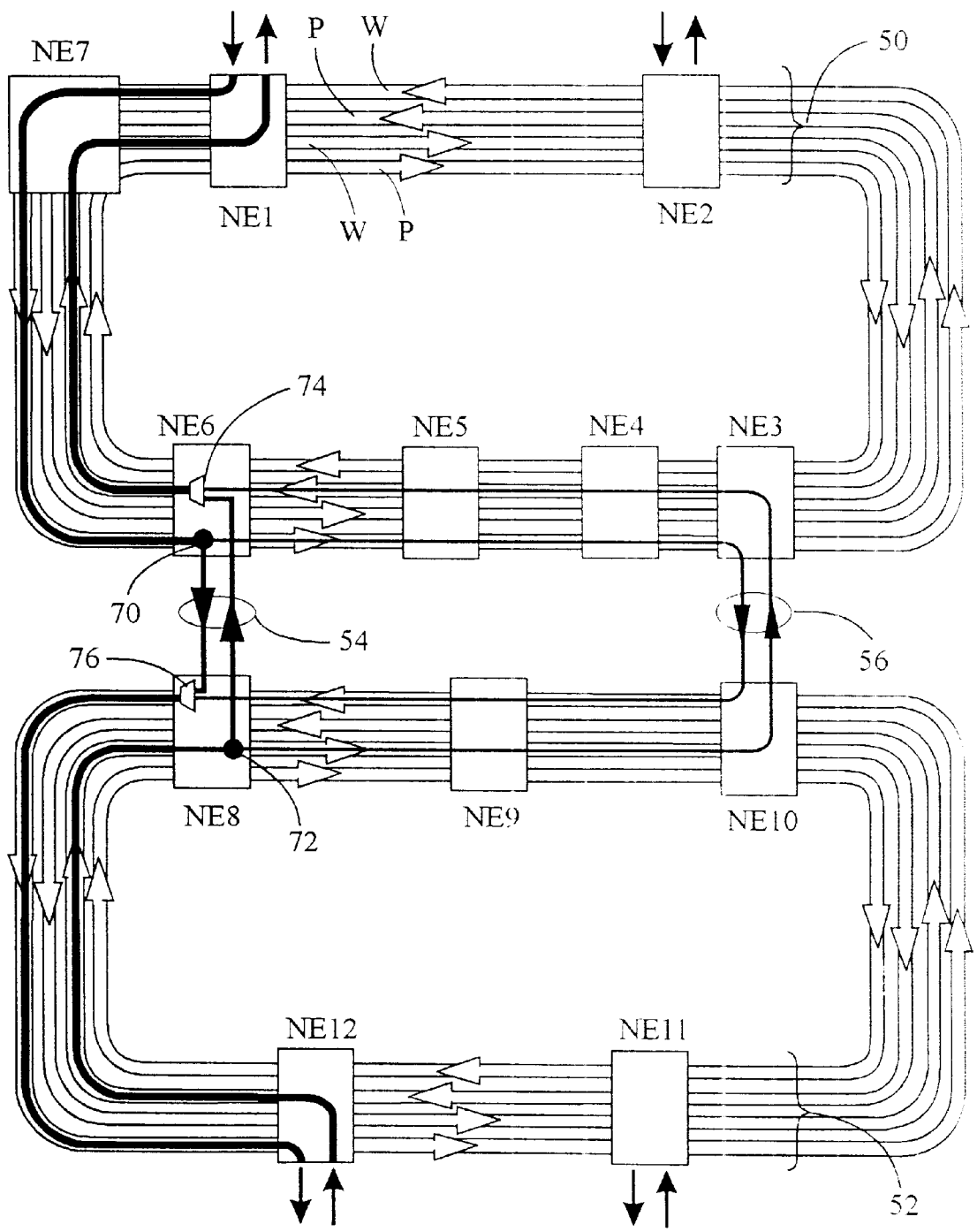
FIG. 4 is a schematic illustration of operations of matched nodes connecting two BLSRs.
Figure 5:
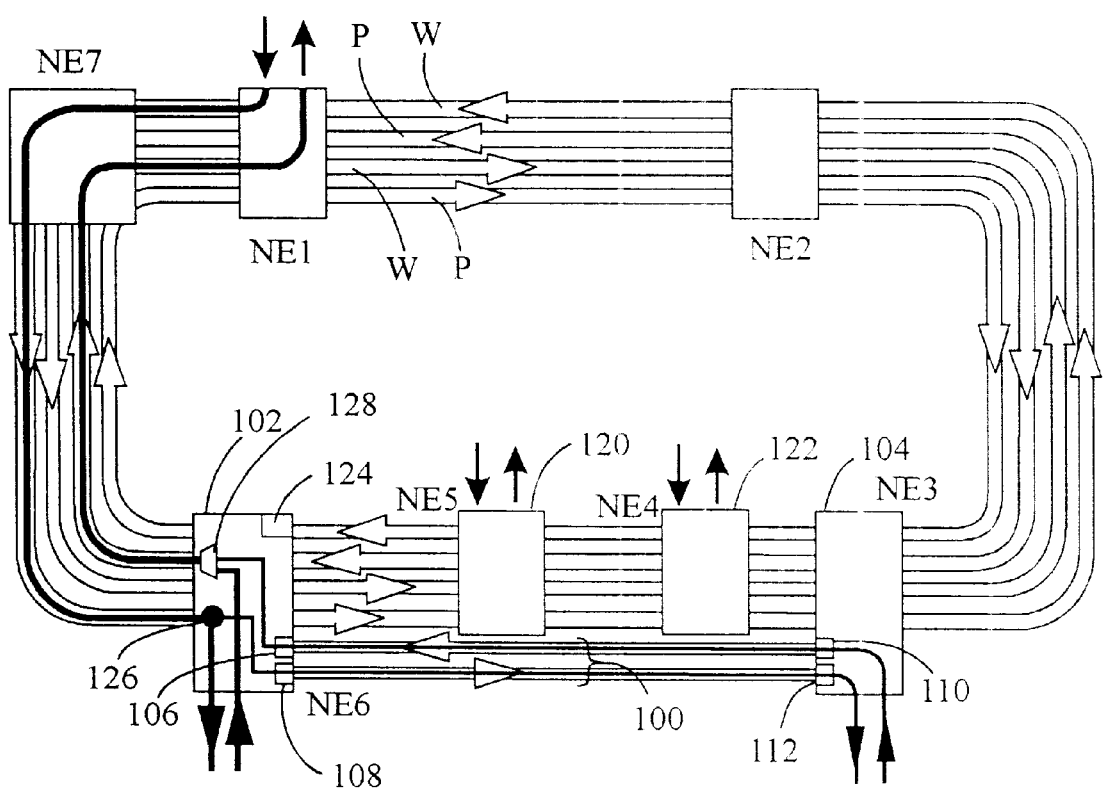
FIG. 5 shows schematically one embodiment of the present invention.

FIG. 5 shows schematically one embodiment of the invention. In the figure, an additional link 100 is specifically provisioned between the primary node 102 and secondary node 104 for sole purpose of the secondary path in case of primary path failure. The primary node and secondary node each has one or more extra optics module 106, 108, 110 and 112 specifically to handle this secondary traffic. In this way no working and protection bandwidths are needed to be set aside for the secondary path, in other words, existing working and protection bandwidths are left untouched and regular ring protection mechanisms will not be affected. The additional link 100 is not connected to any middle nodes 120 and 122 that may be located between the primary and secondary nodes. Any middle nodes therefore function as regular add/drop nodes and their tributary traffic can be added or dropped at regular full capacity.

A processing module 124 includes a detector which detects a loss of signal indication, signifying a failure in the primary inter-ring connection which includes primary path between two primary nodes and the nodes themselves. An add/drop module 126 performs a drop/continue operation on the ring traffic and a service selector 128 select traffic from between the primary path and the dedicated secondary path 100 in response to the failure indication.

The additional link is completely dedicated for the use of the secondary path and is bidirectional. As shown in FIG. 5, separate dedicated fibers, one in each direction, can be provided. In a further embodiment, if multiple wavelengths fibers and DWDM (Dense Wavelength Division Multiplexing) are used in the ring, no extra fibers may be needed to realize the present invention, as long as a specifically dedicated bandwidth is allocated.

What we claim as our invention is:

1. A fiber optic bidirectional line switched ring including a primary and a secondary nodes through which another fiber optic bidirectional line switched ring is connected by way of a primary path and a dedicated secondary path respectively, comprising:

an additional link provisioned between the primary node and the secondary node to form the dedicated secondary path in two directions, and the primary node having a failure detection module for detecting a failure in the primary path connecting the two rings and a drop/continue module for transmitting traffic in the primary path onto said dedicated secondary path.

2. The fiber optic bidirectional line switched ring according to claim 1, in which the primary node comprises at least one dedicated optic module for transmitting and receiving traffic on the dedicated secondary path.

3. The fiber optic bi-directional line switched ring according to claim 2, in which the secondary node comprises at least one dedicated optic module for transmitting and receiving traffic to and from the primary node on the dedicated secondary path.

4. The fiber optic bidirectional line switched ring according to claim 1, wherein the additional link is at least one optic fiber, each of which provides the dedicated secondary path in either of the two directions.

5. The fiber optic bidirectional line switched ring according to claim 1, wherein the additional link is multiple wavelength fibers forming the ring in DWDM format, one of the multiple wavelengths providing the dedicated secondary path in either one or both directions.

6. The fiber optic bidirectional line switched ring according to claim 1, wherein the additional link is multiple wavelength fibers forming the ring in DWDM format, different wavelengths providing the dedicated secondary path in the both directions.

7. In a telecommunications network of the type having a fiber optic bidirectional line switched ring and a primary and a secondary nodes through which another fiber optic bidirectional line switched ring is connected by way of a primary and a secondary inter-ring connections respectively, a method of providing protection for failure, comprising steps of:

dropping and continuing a traffic at the primary node onto a dedicated secondary path allocated between the primary and secondary nodes, receiving an indication of a failure in the primary inter-ring connection, and invoking the secondary inter-ring connection in response the indication.

8. The method of providing protection for failure according to claim 7, comprising further steps of:

in response to the indication, selecting traffic from between a primary inter-ring connection and the dedicated secondary path.

9. The method of providing protection for failure according to claim 8, in which multiple wavelength fibers form the ring in DWDM format and the method comprising further steps of:

selecting traffic from one of a plurality of wavelengths in the multiple wavelength fibers, said one wavelength providing the dedicated secondary path in one direction.

* * * * *